United States Patent
Jachner

(10) Patent No.: US 8,452,852 B2
(45) Date of Patent: May 28, 2013

(54) SYSTEM AND METHOD FOR PROVIDING AN INFORMATION SERVICE TO DISTRIBUTE REAL-TIME INFORMATION TO USERS VIA A PRESENCE SYSTEM

(75) Inventor: Jack Jachner, Plano, TX (US)

(73) Assignee: Alcatel Lucent, Paris (FR)

( * ) Notice: Subject to any disclaimer, the term of this patent is extended or adjusted under 35 U.S.C. 154(b) by 1072 days.

(21) Appl. No.: 11/314,402

(22) Filed: Dec. 21, 2005

(65) Prior Publication Data

US 2007/0150544 A1 Jun. 28, 2007

(51) Int. Cl.
*G06F 15/16* (2006.01)

(52) U.S. Cl.
USPC ............ 709/219; 709/206; 709/207; 709/218

(58) Field of Classification Search
USPC .... 709/206, 207, 218, 219; 370/229; 713/323
See application file for complete search history.

(56) References Cited

U.S. PATENT DOCUMENTS

| | | | | |
|---|---|---|---|---|
| 2002/0021307 A1* | 2/2002 | Glenn et al. | ................... | 345/753 |
| 2002/0026349 A1* | 2/2002 | Reilly et al. | ..................... | 705/14 |
| 2002/0040374 A1* | 4/2002 | Kent | .............................. | 707/516 |
| 2002/0147000 A1 | 10/2002 | Holmes-Kinsella | | |
| 2003/0023690 A1* | 1/2003 | Lohtia | ........................... | 709/206 |
| 2003/0097485 A1* | 5/2003 | Horvitz et al. | ................ | 709/313 |
| 2003/0110228 A1* | 6/2003 | Xu et al. | ........................ | 709/207 |
| 2004/0037271 A1* | 2/2004 | Liscano et al. | ................ | 370/352 |
| 2004/0068481 A1* | 4/2004 | Seshadri et al. | ................... | 707/1 |
| 2004/0071150 A1* | 4/2004 | Honkala et al. | ................ | 370/401 |
| 2004/0098491 A1* | 5/2004 | Costa-Requena et al. | .... | 709/229 |
| 2004/0122896 A1 | 6/2004 | Gourraud | | |
| 2004/0127215 A1* | 7/2004 | Shaw | ......................... | 455/432.1 |
| 2005/0102389 A1* | 5/2005 | Liscano et al. | ................ | 709/224 |

FOREIGN PATENT DOCUMENTS

EP          1486889 A1     12/2004

* cited by examiner

*Primary Examiner* — Peter Shaw
(74) *Attorney, Agent, or Firm* — Garlick & Markison

(57) ABSTRACT

A presence system provides information services, such as lottery information, stock quotes, entertainment information, travel information and delivery information, to users. The presence system includes a presence server for collecting and storing presence information on an information provider that provides an information service to users. The presence information includes real-time service information enabling the information provider to provide the information service to the users. Upon receiving updated presence information including the real-time service information from the information provider, the presence server provides the real-time service information to the users.

20 Claims, 4 Drawing Sheets

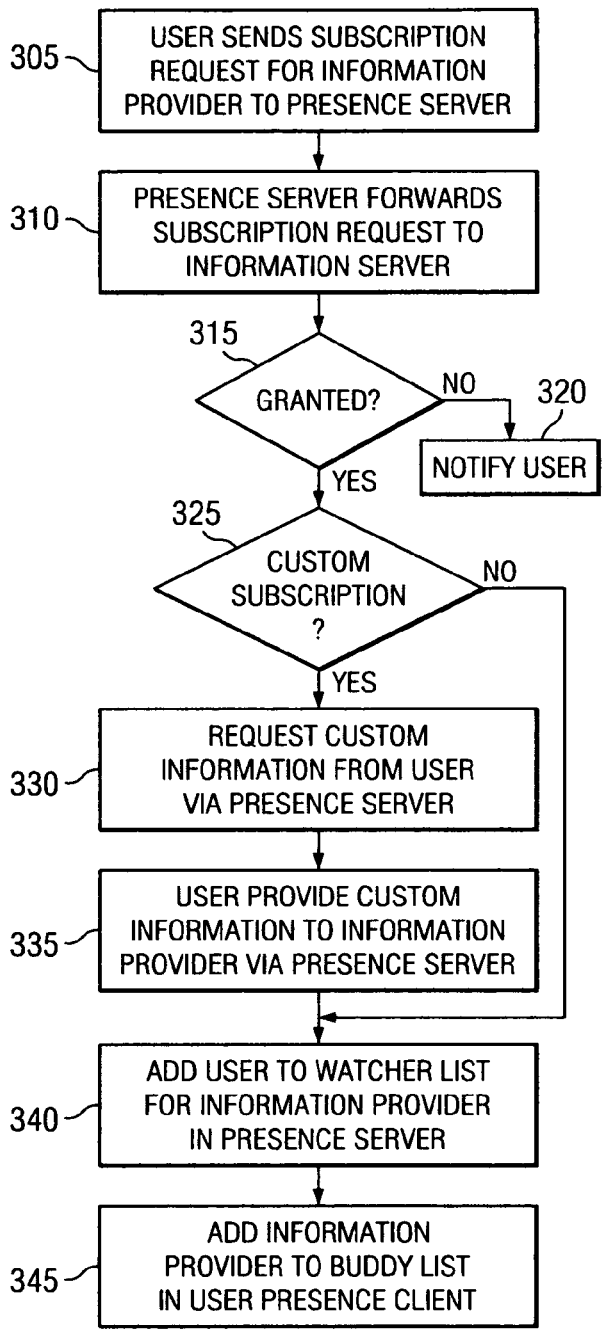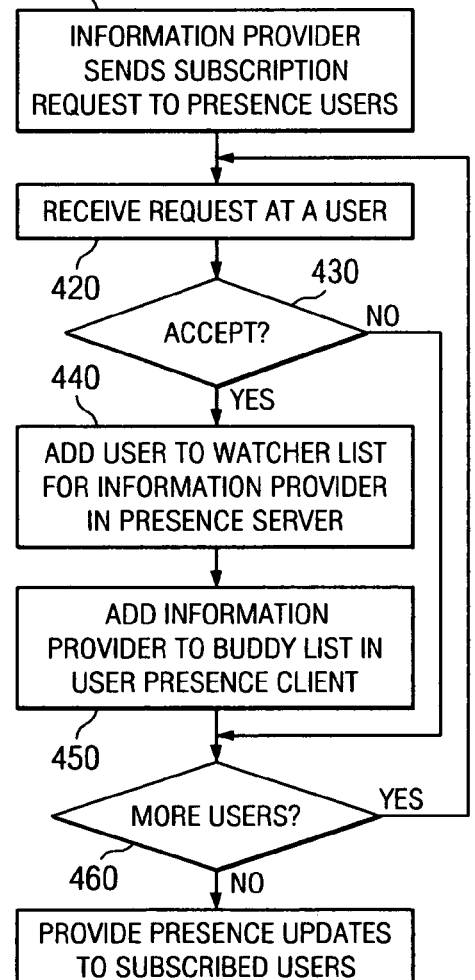

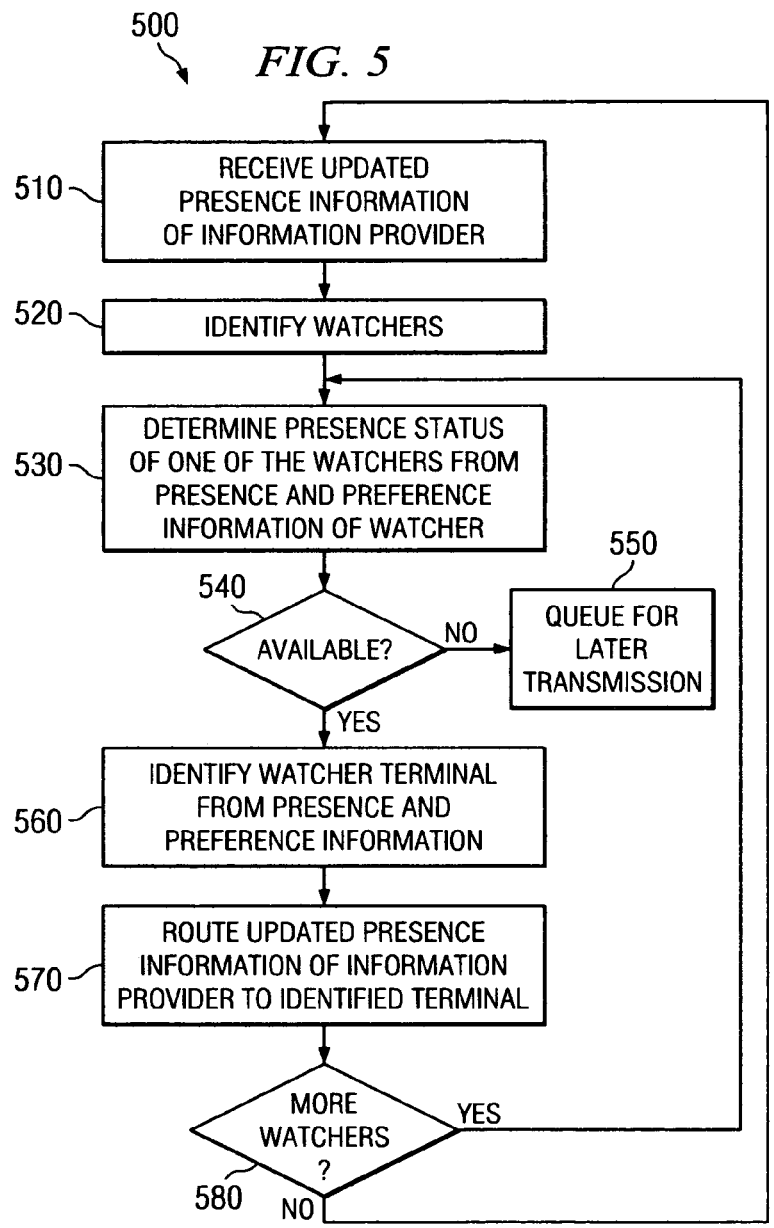

SYSTEM AND METHOD FOR PROVIDING AN INFORMATION SERVICE TO DISTRIBUTE REAL-TIME INFORMATION TO USERS VIA A PRESENCE SYSTEM

BACKGROUND OF THE INVENTION

1. Technical Field of the Invention

The present invention relates in general to a presence-based communication system, and in particular, to providing an information service to users via the presence system.

2. Description of Related Art

Presence-based interactive communication systems enable callees (presentities) to publish, in real-time, their presence information, such as the availability and current status of the callee devices/applications, to callers (presence watchers). Presence systems typically incorporate presence servers to manage the presence information for a plurality of presentities. Presence servers currently automatically receive updated presence information from various presence sources, such as telephone applications or instant messaging applications, and aggregate the received presence information to reflect the presence status of the presentities. For example, when a presentity initiates or receives a voice call on his or her desktop phone, the presence server is notified and changes the presence status of the presentity to "On the Phone."

Presence servers further provide the current presence status of presentities to watchers of the presentities to assist the watchers in establishing real-time voice, text and/or multimedia communication sessions with the presentities. As a result, presence systems facilitate more efficient and effective communication sessions between watchers and presentities.

However, current presence systems are only capable of aggregating and distributing traditional presence information that indicates the availability of a presentity. There are a number of other real-time applications that distribute other types of information to subscribers. For example, users can receive real-time updates on stock quotes, real-time updates on the status of a package being delivered, real-time updates on travel arrangements, such as flight delays and gate changes, and other types of real-time service information. The real-time service information can be displayed as an instant message on their cell phone or PDA, viewed using an e-mail account or provided to them in the form of a voice call or voice message.

In order to receive the real-time service information, users typically must subscribe to an information provider that provides the real-time service information to users. In addition, the user must provide a cell phone number or e-mail address to which the real-time service information can be routed. Whenever updates occur to information for which the user has requested notification, the information provider automatically generates an instant message, e-mail or voice call to the user to provide the updated real-time service information to the user. However, if the user does not provide multiple phone numbers and/or e-mail addresses to which the real-time service information may be routed, the user may not timely receive the updated information. For example, if the updated information is sent via e-mail and the user is not currently on-line, or if the updated information is sent via instant message to the user's cell phone and the user's cell phone is turned off, the user may not read the updated information until it is too late.

Even if the user does provide multiple phone numbers and/or e-mail addresses to the information provider, the information provider may simultaneously route the updated information to all provided phone numbers and/or e-mail accounts, which unnecessarily increases the traffic on the network. In other real-time applications, the information provider may sequentially route the updated information to the user's phone numbers and/or e-mail accounts until the information provider receives confirmation that the user received the real-time update, which also unnecessarily increases the traffic on the network and may delay the delivery of the real-time service information to the user.

In addition, there are also a number of other types of information for which users would like to receive real-time updates, but there is currently no infrastructure established for distributing that real-time service information. Therefore, what is needed is a presence system capable of providing information services to users to distribute real-time service information.

SUMMARY OF THE INVENTION

Embodiments of the present invention provide a presence system for providing an information service to users. The presence system includes a presence server for collecting and storing presence information on a plurality of presentities and providing presence information to watchers of the presentities. In accordance with embodiments of the present invention, one of the presentities is an information provider capable of providing an information service to users and the watchers of the information provider include one or more users. The presence server is operable to receive updated presence information from the information provider, in which the updated presence information includes real-time service information enabling the information provider to provide the information service to said users. The presence server is further operable to provide the real-time service information to the users. The real-time service information includes, for example, lottery information, stock quote information, entertainment information, travel information or delivery information.

In one embodiment, the presence server forwards a subscription request from one of the users to the information provider. In another embodiment, the presence server forwards a subscription request from the information provider to one of the users. Upon receiving notification of acceptance of the subscription request from the information provider or user, the presence server adds that user to a list of watchers of the information provider.

In a further embodiment, the real-time service information includes custom information for custom users. The presence server identifies the custom users and provides the custom information to the custom users. For example, in an exemplary embodiment, the presence server maintains watcher groups for the information provider, in which each of the watcher groups includes one or more watchers of the information provider. The presence server identifies the custom users by determining the watcher group that subscribes to the custom information.

Embodiments of the present invention further provide a method for providing an information service to distribute real-time service information to users via a presence system. The method includes subscribing users to presence information of an information provider to enable the information provider to provide the information service to the users. The method further includes receiving updated presence information from the information provider, in which the updated presence information includes real-time service information associated with the information service, and providing the real-time service information to the users.

BRIEF DESCRIPTION OF THE DRAWINGS

A more complete understanding of the present invention may be obtained by reference to the following detailed description when taken in conjunction with the accompanying drawings wherein:

FIG. 3 is a flowchart illustrating an exemplary process for subscribing to an information provider via the presence system, in accordance with embodiments of the present invention;

FIG. 4 illustrates another exemplary process for subscribing to an information provider via the presence system, in accordance with embodiments of the present invention; and FIG. 5 is a flowchart illustrating an exemplary process for providing an information service to distribute real-time service information to users via the presence system, in accordance with embodiments of the present invention.

DETAILED DESCRIPTION OF THE DRAWINGS

Figure 1:
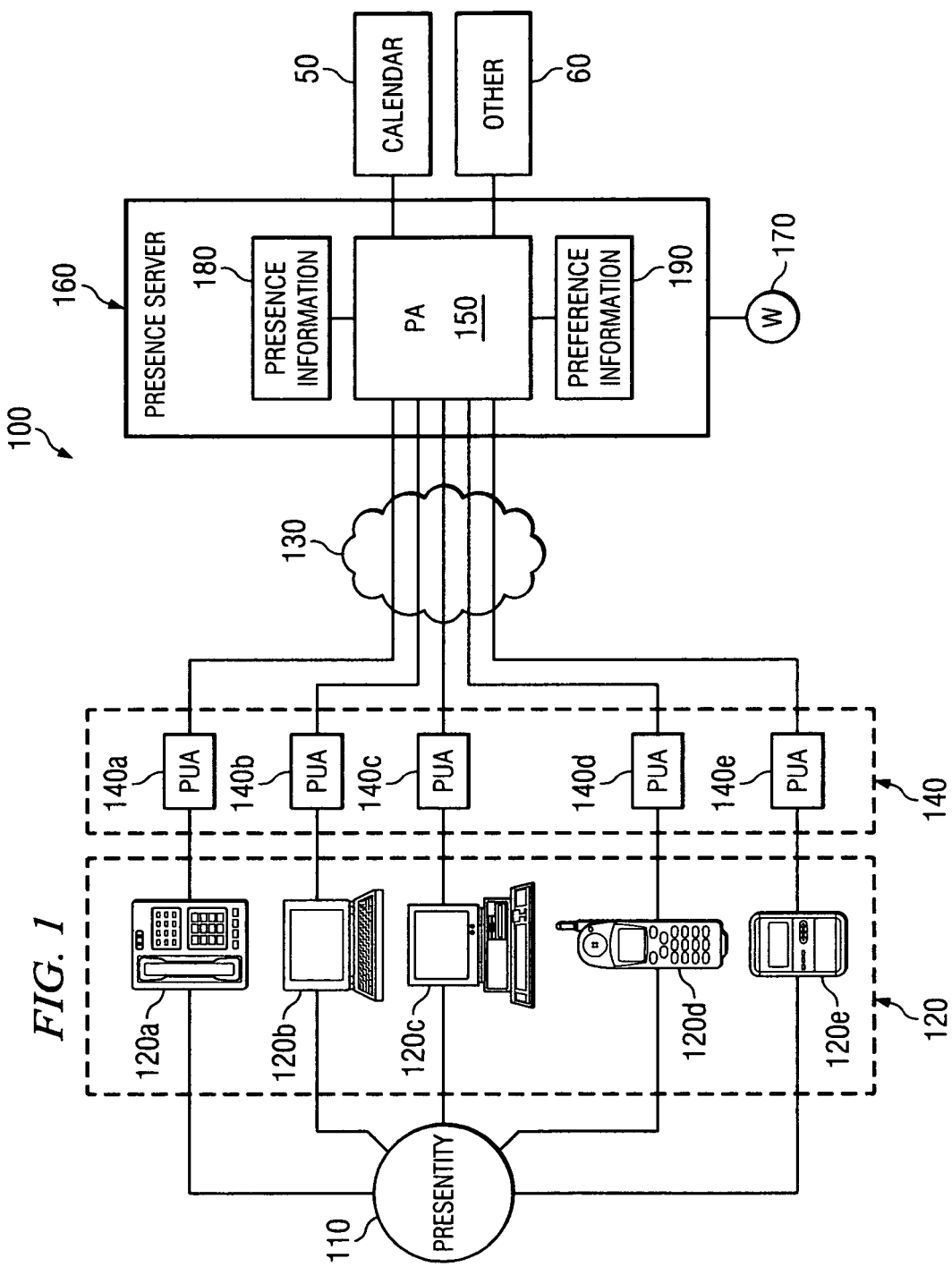
FIG. 1 illustrates an exemplary presence system in accordance with embodiments of the present invention.

Referring to FIG. 1, there is illustrated an exemplary presence system 100 capable of implementing various embodiments of the present invention. The presence system 100 includes one or more presentities (one of which is shown for convenience) 110 and one or more terminals 120 associated with the presentity 110. The presentity 110 represents the callee and provides presence information on the callee's presence status to the presence system 100. Each terminal 120 is a physical communications device capable of sending and/or receiving communications over a communications network 130. Examples of such terminals 120 include, but are not limited to, a desktop phone 120a, a laptop computer 120b, a personal computer 120c, a cell phone 120d and a personal digital assistant (PDA) 120e. In FIG. 1, the communications network 130 represents any type of network over which media (e.g., circuit-switched or packet-switched voice or data) may be sent. For example, the communications network 130 can include the Public Switched Telephone Network (PSTN), Public Land Mobile Network (PLMN), one or more private local area networks (LANs), the Internet and/or any other type or combination of networks.

The presence system 100 further includes one or more presence user agents 140 (PUAs), a presence agent (PA) 150, a presence server 160 and one or more watchers 170 of the presentity 110. The PUAs 140 are capable of manipulating and providing presence information for the presentity 110. In FIG. 1, a separate PUA 140 is shown for each terminal 120. However, it should be understood that in other embodiments, the number of PUAs 140 can vary based on the number and type of terminals 120, the applications supported by the terminals 120 and the system configuration. Each PUA 140 represents a telephony application that independently generates a component of the overall presence information for a presentity 110. Typically, PUA 140 generates presence information when a change in presence status occurs. Examples of changes in presence status include, but are not limited to, turning on and off a terminal 120, modifying the registration from a terminal 120 and changing the instant messaging status on a terminal 120. As an example, when a presentity initiates or answers a phone call, the telephone application notifies the presence server to set the presentity's presence status to "On the Phone."

The presence information from each of the PUAs 140 is collected by one or more presence agents (PAs) 150. In FIG. 1, only one PA 150 is shown for simplicity. However, it should be understood that in other embodiments, there can be multiple PAs 150 for a presentity 110, each of which is responsible for a subset of the total subscriptions (requests for presence information from watchers 170) currently active for the presentity 110.

In addition, the PA 150 collects presence information from one or more calendar/scheduler applications 50 (e.g., Microsoft Exchange Server®, IBM Lotus Notes®, Meeting Maker® or other similar application) and other sources 60 of presence information (e.g., an instant messaging application). For example, if a presentity has a meeting scheduled on his or her calendar from 10:00 a.m. to 12:00 p.m., at 10:00 a.m., the calendar/scheduler application 50 notifies the PA 150 to set the presentity's presence status to "In a Meeting." The PA 150 aggregates the presence information from each of the sources (e.g., PUA's 140, calendar 50 and other sources 60) and maintains the current complete presence information for the presentity 110. The presence information 180 indicates, for example, the availability of the presentity, the current activity of the presentity, the local time where the presentity is located, the current location of the presentity and the current status of the active terminals and/or applications running on active terminals. The PA 150 is further operable to provide the presence information to one or more watchers 170 (callers or communication session initiators) who have subscribed to the presence service of the presentity 110.

The presence server 160 further stores preference information 190 (e.g., terminal preferences) for the presentities 110 and watchers 170 of the presence system 100. For example, the preference information 190 can include both presentity preference information (e.g., privacy filters) set by the presentity 110 for each watcher 170 and watcher preference information (e.g., watcher filters) set by each watcher 170 for presentities 110. The preference information 190 operates to filter the presence information 180 of a presentity 110 provided to a watcher 170 to accommodate privacy concerns, prioritization requirements, administrator policies and security considerations.

The presence server 160 is a physical entity that can operate as either the PA 150 or as a proxy server for routing requests from watchers 170 to the PA 150. The presence server 160 stores the presence information 180 and preference information 190 for a plurality of presentities 110 and watchers 170. Thus, the PA 150, in combination with the presence server 160, is operable to receive presence information of the presentity 110 from the PUAs 140, receive requests from watchers 170 for the presence information and provide the presence information to the watcher(s) 170. When acting as a PA 150, the presence server 160 can also be co-located with a PUA 140.

The presence system 100 uses a presence protocol to provide presence services to presentities 110 and watchers 170. An example of a presence protocol that can be used in the presence system 100 is the Session Initiation Protocol (SIP), as described in J. Rosenberg, et al., "SIP: Session Initiation Protocol" RFC: 3261, June 2002 and in A. Roach, et al., "Session Initiation Protocol (SIP)—Specific Event Notification," RFC: 3265, June 2002, each of which are hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the International Telecommunication Union—Telecommunications ("ITU-T") H.263 standard (video CODEC), the G.711 and G.729 standards (audio CODECs), and other or additional standards or protocols. As will be appreciated, other or additional protocols and configurations may be used.

SIP networks are capable of routing requests from any user on the network to the server that maintains the registration state for a user. Thus, SIP networks enable a caller (watcher) to transmit a SUBSCRIBE request for presence information relating to a particular callee (presentity 110) to be routed to the presence server 160 that maintains the presence information for the presentity 110. In operation, the presence server 160 and PA 150 may be co-located with the SIP proxy/registrar for efficiency purposes.

Figure 2:
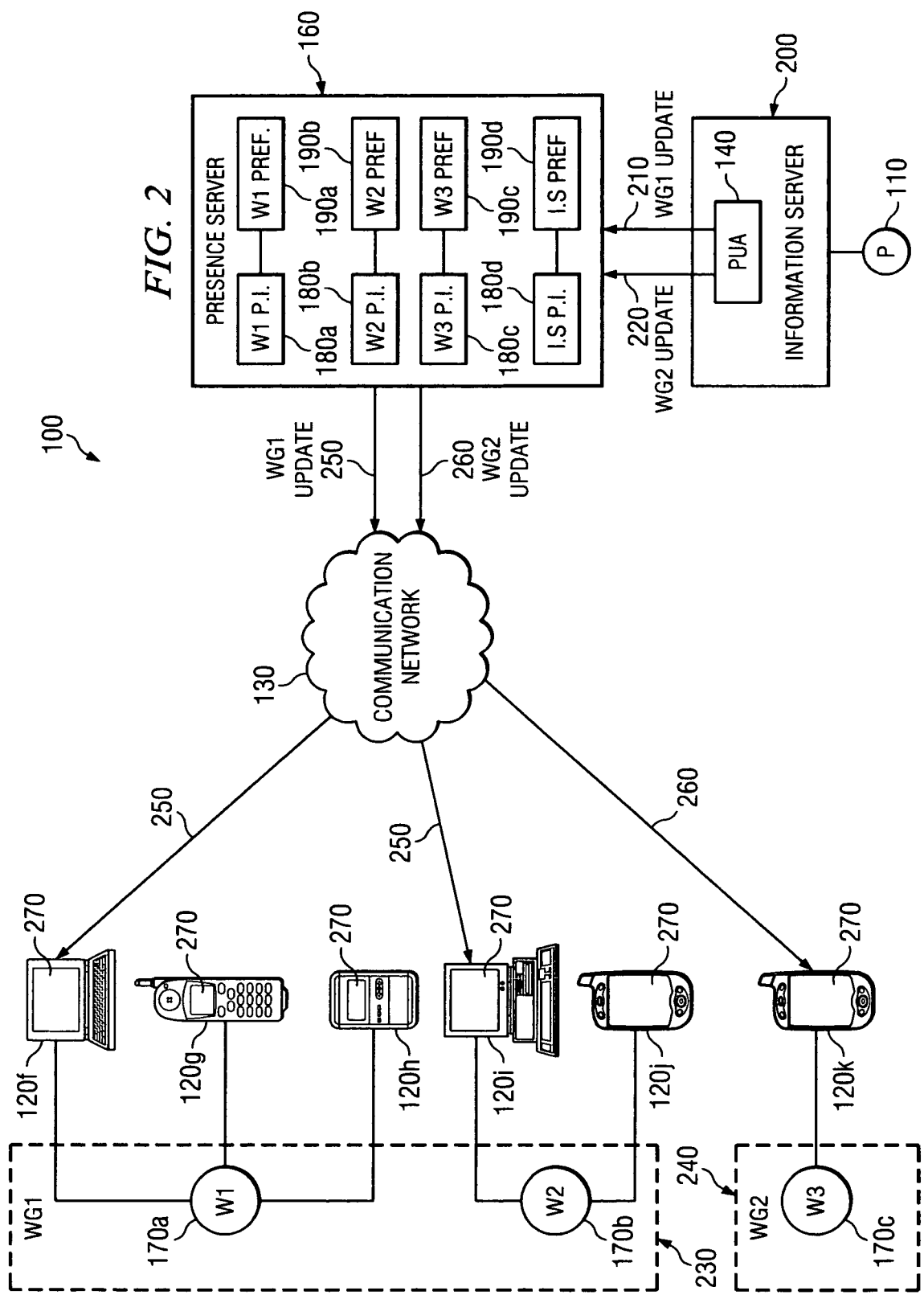
FIG. 2 illustrates an exemplary presence system for providing an information service to distribute real-time service information to users, in accordance with embodiments of the present invention.

FIG. 2 illustrates an exemplary presence system 100 for providing an information service to distribute real-time service information users, in accordance with embodiments of the present invention. In FIG. 2, the presentity 110 is an information provider and the watchers 170a, 170b and 170c include users who have subscribed to receive real-time service information from the information provider. The information provider has an information server 200 associated therewith that generates and/or receives the real-time service information.

By way of example, but not limitation, such real-time service information can include stock quotes, travel information (e.g., flight status or other travel-related information), delivery information (e.g., the status of a package being delivered), lottery information (e.g., winning lottery or Keno numbers, prize size, next drawing date or Keno game time, etc.) and entertainment information. Examples of entertainment information include a notification that a radio station is playing a particular song, a notification that a particular television program or movie is currently running on a particular television channel and a notification that a particular movie is showing in a local theater or has been released on DVD.

The information service is enabled in the presence system 100 using a presence server 160 that maintains presence information 180 and preference information 190 on the information provider and users. Thus, the presence server 160 maintains presence information 180a and preference information 190a on user 170a, presence information 180b and preference information 190b on user 170b, presence information 180c and preference information 190c on user 170c and presence information 180d and preference information 190d on information server 200.

The information server 200 includes a presence user agent (PUA) 140 that provides updated presence information (e.g., updated presence information 210 or 220) to the presence server 160. In accordance with embodiments of the present invention, the PUA 140 is configured to detect the generation or receipt of real-time service information (e.g., real-time service information 250 or 260) and to automatically generate updated presence information including the real-time service information to the presence server 160. Specifically, upon receiving real-time service information (e.g., real-time service information 250), the PUA 140 encapsulates the real-time service information 250 within an updated presence information 210 message sent to the presence server 160. Thus, real-time service information can be distributed to users 170a, 170b and 170c via standard presence distribution protocols (e.g., SIP/SIMPLE NOTIFY messages).

In one embodiment, the real-time service information is generic real-time service information provided to all users 170a, 170b and 170c. In this embodiment, either the PUA 140 can include the identities of all users to receive the generic real-time service information in the updated presence information or the presence server can identify the users based on preference information 190 stored in the presence server 160. For example, the presence server 160 can store the identity of all users 170a-170c who have subscribed to the information provider to receive the generic real-time service information in a list of watchers for the information provider. Upon receipt of the updated presence information containing the generic real-time service information, the presence server accesses the list of watchers for the information provider and routes the generic real-time service information to all watchers on the list.

In another embodiment, the real-time service information is custom information provided to select ones of the users 170a, 170b and 170c. For example, as shown in FIG. 2, the PUA 140 provides first updated presence information 210 including first real-time service information 250 to the presence server 160 and second updated presence information 220 including second real-time service information 260 to the presence server 160. The first real-time service information 250 is routed to users 170a and 170b, while the second real-time service information 260 is routed to user 170c. The PUA 140 can include the identities of users 170a and 170b within the first updated presence information 210 or the presence server 160 can determine the identities of users 170a and 170b based on preference information 190 stored in the presence server 160.

For example, the presence server 160 can maintain one or more watcher groups 230 and 240 for a particular presentity 110. As used herein, the term "watcher group" refers to one or more watchers 170 of a particular presentity 110. In FIG. 2, users/watchers 170a and 170b form watcher group WG1 230 while user/watcher 170c forms watcher group WG2 240. In one embodiment, the PUA 140 can identify the particular watcher group 230 or 240 to receive the real-time service information 250 or 260 in the updated presence information 210 or 220, respectively. In another embodiment, the information provider can define its preference information 190d such that the presence server 160 is able to identify the watcher group 230 or 240 for the real-time service information 250 or 260. For example, the preference information 190d can include "key words" or other identifiers that the presence server 160 can use to match against the real-time service information 250 or 260 to determine which watcher group 230 or 240 is to receive the real-time service information 250 or 260.

Once the presence server 160 identifies the watchers (e.g., watchers 170a and 170b) to which the presence server 160 will route the real-time service information 250, in accordance with further embodiments of the present invention, the presence server 160 determines the current presence state of each of the watchers 170a and 170b and each terminal associated with each of the watchers 170a and 170b to determine which terminals to route the real-time service information 250 to.

The current presence state of each watcher 170a-170c and terminal 120f, 120g, 120h, 120i, 120j and 120k associated therewith is determined similarly, and therefore, only the determination of the presence state of terminal 120f and watcher 170a associated with terminal 120f will be discussed herein. To determine the current presence state of the watcher 170a associated with terminal 120f, the presence server 160 first determines the media status and availability of the watcher 170a associated with terminal 120f to receive the real-time service information 250 in one or more media types (e.g., text or voice). In some embodiments, the real-time service information 250 is sent in only a single media type. In other embodiments, the real-time service information 250 is sent in multiple media types, or can be converted between media types by the presence server 160.

If the watcher 170a is available to receive the real-time service information 250 in a particular media type, the presence server 160 then determines the media status and availability of the particular terminal 120f for the real-time service information 250 in the particular media type. As used herein, the term "media status" refers to one and only one of the following states at any particular time instance: INACTIVE, ACTIVE, IN USE, BUSY. In addition, as used herein, the term "availability" refers to one and only one of the following states at any particular time instance: AVAILABLE, UNAVAILABLE.

More specifically, the presence information 180a and preference information 190a of the watcher 170a is used to obtain the availability and media status of the watcher 170a and terminal 120f. Such preference information 190a can include information identifying the media types supported by each terminal associated with the watcher 170a, including terminal 120f, and information identifying the media types supported by each application running on each terminal associated with the watcher. The presence information 180a of the watcher 170a can include, for example, a current number of real-time voice communication sessions engaged in by the watcher 170a, a current number of real-time multimedia communication sessions engaged in by the watcher 170a and a current number of real-time text communication sessions engaged in by the watcher 170a. Furthermore, in other embodiments, the presence information 180a of the watcher 170a can include an activity-media status mapping to update the media status of media types upon the start/termination of a scheduled activity, such as a meeting, out-to-lunch, steering a car, engaged in voice communication session etc. For example, the watcher 170a associated with terminal 120f may enter preference information 190a specifying that no media types or only certain media types are available on any terminal of the watcher 170a or particular terminals of the watcher 170a (e.g., terminal 120f) when the watcher's calendar indicates that the watcher 170a is in a meeting.

In exemplary embodiments, the presence server 160 compares the current media status of the watcher 170a associated with terminal 120f in the one or more media types with watcher preference information 190a specifying a maximum number of interactions per media type supported by the watcher 170a. The maximum number of interactions for a particular media type indicates the maximum number of real-time interactions the watcher 170a can handle before the particular media status enters the BUSY state. The maximum number of interactions is specified by the user/watcher as part of his/her preference rules. The maximum number of interactions specified in the preference information 190a may not be the same as the actual maximum number of interactions that the watcher is capable of supporting. For example, the watcher may have two terminals, each capable of supporting three IM communication sessions, two voice communication sessions and one multimedia communication session. However, the watcher 170a may set the preference information 190a to limit the number of concurrent IM communication sessions to two (one for each terminal), and to prevent any multimedia communication sessions from being routed to any terminal of the watcher 170a while the watcher 170a is engaged in a voice communication session on either terminal.

From the maximum number of interactions in the preference information 190a and the presence information 180a, the presence server 160 determines the media status (INACTIVE, ACTIVE, IN USE or BUSY) and availability (AVAILABLE or UNAVAILABLE) of the watcher 170a to receive the real-time service information 250 in one or more media types. For each media type, INACTIVE signifies that the user/watcher is not ready to process interactions with this specific media type. For example, the INACTIVE state applies when the watcher 170a is not logged onto the network using any device capable of supporting that specific media type. In addition, the INACTIVE state might be caused by a conclusion that there are currently no active devices of the watcher 170a that both support the particular media type and meet any other criteria specified by the information provider. The ACTIVE state indicates that the user/watcher is ready to process interactions with this specific media type. For example, the ACTIVE state applies when at least one terminal of the watcher that supports the specific media type is logged onto the network.

For each media type, the IN USE state indicates that the watcher 170a is involved in one or more communication sessions using this specific media type. However, the watcher 170a is still capable of processing additional interactions with the same media type on one or more terminals. For each media type, the BUSY state indicates that the watcher 170a is not capable of engaging in any communication sessions with that media type on any terminal. For example, the BUSY state might be caused by limitations of resources (e.g., communication channels), by limitations of the watcher's capability (e.g., the maximum number of interactions for the specific media type has been reached) or by preferences specifying that the particular media type is unavailable when the watcher's calendar indicates that the watcher is in a meeting, traveling, off-site, etc.

If the watcher's media status in a particular media type is "INACTIVE" or "BUSY," the presence server 160 determines that any terminal associated with that watcher 170a is UNAVAILABLE to receive the real-time service information 250. Therefore, terminal 120f and any other terminal associated with that watcher 170a would be deemed UNAVAILABLE to receive the real-time service information 250. In one embodiment, when the watcher 170a is UNAVAILABLE, the presence server 160 stores the real-time service information 250 for the watcher 170a until the presence server 160 receives updated presence information 180a indicating that the watcher 170 is now AVAILABLE.

However, if the media status of the watcher 170a is "ACTIVE" or "IN USE," the presence server 160 determines that the watcher 170a is currently AVAILABLE for the communication session. If the presence server 160 determines that the watcher 170a is AVAILABLE, the presence server 160 next determines the media status and availability of each terminal 120f, 120g and 120h associated with the watcher 170a.

Again, the presence server 160 can compare the current media status of a particular terminal 120f of the watcher 170a in a particular media type with preference information 190a specifying a maximum number of interactions per media type supported by the terminal 120f. For example, terminal 120f may be capable of simultaneously supporting unlimited text (e.g., IM) communication sessions, two voice communication session and one multimedia communication session, but the watcher 170a may set his/her preference information 190a to limit the number of IM communication sessions to two, the number of voice communication sessions to one, and prevent any multimedia communication sessions while engaged in a voice communication on terminal 120f.

From the maximum number of interactions in the preference information 190a and the presence information 180a, the presence server 160 determines the media status (INACTIVE, ACTIVE, IN USE or BUSY) and availability (AVAILABLE or UNAVAILABLE) of the terminal 120f to receive the real-time service information in one or more media types. For each media type, INACTIVE signifies that the terminal 120f is not capable of or ready to process interactions with this specific media type. The ACTIVE state indicates that the terminal 120f is capable of and ready to process interactions with this specific media type. The IN USE state indicates that the terminal 120f is involved in one or more communication sessions using this specific media type. However, the terminal 120f is still capable of processing additional interactions with the same media type (i.e., there are additional communication channels to this terminal 120f in the particular media type), and the preference information 190a does not preclude additional interactions of this media type. The BUSY state indicates that the terminal 120f is not able to engage in any additional communication sessions with that media type (i.e., there are no more available communication channels to this terminal 120f in the particular media type).

If the media status of the terminal 120f in the particular media type is "INACTIVE" or "BUSY," the presence server 160 determines that terminal 120f is UNAVAILABLE to receive the real-time service information 250. However, if the media status of the terminal 120f is "ACTIVE" or "IN USE," the presence server 160 determines that terminal 210 is AVAILABLE for the communication session.

Thus, if the presence server 160 indicates that both the watcher 170a associated with terminal 120f and terminal 120f are currently AVAILABLE to receive the real-time service information, the presence server 160 includes terminal 120f in a list of available terminals for the watcher 170a. If the watcher 170a specified an order of preference for terminals to receive the real-time service information 250 from the information server 200 or information in a particular media type, the presence server 160 routes the real-time service information 250 to the most preferred terminal (e.g., terminal 120f) that is currently AVAILABLE. For example, in FIG. 2, the presence server 160 routes the real-time service information 250 to terminal 120f of watcher 170a.

In embodiments in which the real-time service information 250 or 260 is sent as an instant message to the user, to receive and display the real-time service information 250, each terminal 120f-120k includes a presence user client 270. The presence user client 270 includes any hardware, software, firmware, or combination thereof for interfacing with the presence server 160. As an example, the presence user client 270 could include one or more processors that execute instructions and one or more memories that store instructions and data used by the processors. The processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein.

The presence user client 270 is operable to receive the real-time service information 250 or 260 from the presence server 160 and interfaces with the terminal 120 on which the presence user client 270 is running to provide the real-time service information 250 or 260 to the user. For example, the presence user client 270 can include a graphical user interface for displaying the real-time service information 250 or 260 on the terminal 120.

In addition, the presence user client 270 further communicates with the presence server 160 to receive traditional presence information 180. For example, the presence user client 270 can maintain a list of presentities for whom the user is a watcher, display the presence status of the presentities on the list and display the real-time service information 250 of the information provider presentity. As an example, the presence user client 270 can add the information provider name to a contact list or "Buddy List" and display in real-time the presence status of the information provider and any real-time service information 250 or 260 sent from the information provider. As another example, the presence user client 270 can display a respective icon for each presentity and any real-time service information 250 or 260 next to the information provider icon.

In further embodiments, the presence user client 270 also enables the user to contact the information provider using instant message, voice or multimedia. For example, the user can click on the icon to bring up a menu of available options, such as "Send an Instant Message to this Presentity", "Call this Presentity" and "E-mail this Presentity." The options available to the user depend on the information provider contact information the presence user client 270 has access to and the presence status of that contact information. The contact information can be entered into a contacts application (e.g., "Buddy List"), calendar application or other application that is capable of interfacing with the presence user client 270. The contact information may also be downloaded by the presence user client 270 from the presence server 160, depending upon the configurations of the presence server 160 and preferences 190d of the information provider. The presence user client 270 communicates with the presence server 160 to determine the presence status of each option. If one or more options are available, the user can select (e.g., "click on") one of the options to contact the information provider.

For example, in lottery applications, the user can send an IM or e-mail or initiate a voice call to the lottery provider to buy more lottery tickets, inquire about historical results, request a link to a web page or register a specific lottery ticket number so that custom real-time service information can be presented to the user. As an example, the custom real-time lottery information can include "Not a winner, try again," or "Congratulations, you have won $3.00."

FIG. 3 is a flowchart illustrating an exemplary process 300 for subscribing to an information provider via the presence system, in accordance with embodiments of the present invention. The process begins at block 305 where a user sends a subscription request to subscribe to receive real-time service information from a particular information provider to the presence server. At block 310, the presence server forwards the subscription request to the information provider for processing.

At block 315, the presence server determines whether the information provider has granted the subscription of the user. If not, at block 320, the presence server notifies the user. If so, at block 325, a determination is made whether the subscription for the user is a custom subscription. If so, at block 330, the information provider requests custom subscription information from the user via the presence server to establish the parameters of the custom subscription. In response, at block 335, the user provides the requested custom subscription information to the information provider via the presence server.

Thereafter, at block 340, once the subscription is granted and/or the custom subscription information is received, the presence server adds the user to a watcher list for the information provider. For example, in one embodiment, the presence server adds the user to a generic watcher list to receive generic real-time service information from the information provider. In another embodiment, the presence server adds the user to a watcher group to receive custom information in accordance with the custom subscription with the information provider. In addition, at block 345, the presence server interfaces with the presence user clients of the user to add the information provider to a "Buddy List" or other list of presentities for the user.

FIG. 4 illustrates another exemplary process 400 for subscribing to an information provider via the presence system, in accordance with embodiments of the present invention. The process begins at block 410 where an information provider sends a subscription request to subscribe to receive real-time service information from the information provider to one or more presence users via the presence server. At block 420, the subscription request is received at a particular user.

At block 430, the presence server determines whether the particular user has accepted the subscription. If so, at block 440, the presence server adds the user to a watcher list for the information provider, as described above. In addition, at block 450, the presence server interfaces with the presence user clients of the user to add the information provider to a "Buddy List" or other list of presentities for the user. At block 360, this process is repeated for each user to whom the information provider sent the subscription request. Thereafter, at block 470, presence updates including the subscribed real-time service information are sent to the subscribed users.

FIG. 5 is a flowchart illustrating an exemplary process 500 for providing an information service to distribute real-time service information to users via the presence system, in accordance with embodiments of the present invention. The process begins at block 510 where updated presence information including real-time service information is sent from a presence user agent of the information provider to a presence server. At block 520, upon receiving the updated presence information, the presence server identifies one or more watchers of the information provider that are to receive the real-time service information. For example, in one embodiment, the updated presence information identifies one or more watchers or watcher groups to which the real-time service information is to be distributed. In another embodiment, the real-time service information is generic information to be sent to generic watchers of the information provider. In yet another embodiment, the updated presence information and/or real-time service information includes a "key word" or other identifier used by the presence server to determine the watchers and/or watcher groups to which the real-time service information is to be distributed.

Thereafter, at block 530, the presence server determines the presence status of one of the watchers to which the real-time service information is to be distributed using presence information and preference information associated with the watcher. From the presence status, the presence server determines at block 540 whether the watcher is currently available to receive the real-time service information. If not, at block 550, the real-time service information is queued for later transmission to the watcher. If so, at block 560, the presence server identifies a watcher terminal to receive the real-time service information from the presence and preference information of the watcher, and at block 570, the presence server routes the real-time service information sent by the information provider to the identified watcher terminal. At block 580, this process is repeated for all watchers to whom the current real-time service information and all future real-time service information is to be distributed.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

I claim:

1. A presence system for providing an information service to users, comprising:
   a presence server for collecting and storing presence information on a plurality of presentities and providing said presence information to watchers of said presentities;
   wherein one of said presentities is an information provider capable of producing real time service information to provide said information service to users and said watchers of said information provider include said users, said presence system enabling said information provider to provide said information service to said users;
   wherein said presence server further maintains watcher groups for said information provider, each of said watcher groups including one or more of said watchers of said information provider;
   wherein said presence server receives updated presence information from said information provider, said updated presence information being said real-time service information, said presence server further for matching said real time service information against preference information including key words defined by said information provider to determine a select one of said watcher groups to receive said real time service information;
   wherein said presence server further maintains watcher presence information and watcher preference information for each of said watchers, said watcher preference information specifying that no media types or only certain media types are available on any terminal of the watcher or particular terminals of the watcher when the watcher presence information indicates a busy status; and
   wherein said presence server provides said real-time service information as said updated presence information to available terminals of said watchers within said select watcher group.

2. The presence system of claim 1, wherein said presence server is further operable to forward a user subscription request from a select one of said users to said information provider, and upon receiving notification of acceptance of said user subscription request from said information provider, said presence server is further operable to add said select user to a list of said watchers of said information provider.

3. The presence system of claim 1, wherein said presence server is further operable to forward an information provider subscription request from said information provider to a select one of said users, and upon receiving notification of acceptance of said information provider subscription request from said select user, said presence server is further operable to add said select user to a list of said watchers of said information provider.

4. The presence system of claim 1, further comprising:
   a presence user client associated with a select one of said users operable to receive said real-time service information from said presence server.

5. The presence system of claim 4, further comprising:
   a terminal on which said presence user client is running, said terminal providing said real-time service information to said select user.

6. The presence system of claim 5, wherein said presence user client further maintains a list of said presentities for whom said select user is a watcher, and enables said select user to contact said presentities on said list.

7. The presence system of claim 1, wherein said real-time service information includes custom information for said select watcher group.

8. The presence system of claim 7, wherein said select watcher group subscribes to said custom information.

9. The presence system of claim 1, wherein said presence server is further operable to maintain provider preference information associated with said information provider, and to provide said updated presence information to said users based on said provider preference information.

10. The presence system of claim 1, wherein said presence server is further operable to maintain user preference information associated with a select one of said users and to provide said updated presence information to said select user based on said user preference information.

11. The presence system of claim 1, wherein said presence server is further operable to determine a presence status of a select one of said users, said presence status indicating the availability of said select user, and wherein said presence server is additionally operable to queue said updated presence information until said presence status indicates said select user is available.

12. The presence system of claim 11, wherein, upon determining said presence status indicates said select user is available, said presence server is further operable to identify a terminal associated with said select user to which said presence server routes said updated presence information.

13. The presence system of claim 1, wherein said real-time service information includes one or more of lottery information, stock quote information, entertainment information, travel information and delivery information.

14. A method for providing an information service to distribute real-time service information to users via a presence system, comprising the steps of:
    subscribing users to presence information of an information provider capable of producing real time service information, said information provider using said presence system to provide said information service to said users;
    maintaining watcher groups for said information provider, each of said watcher groups including one or more of said users;
    receiving updated presence information from said information provider, said updated presence information being said real-time service information, said real-time service information being associated with said information service;
    matching said real time service information against preference information including key words defined by said information provider to determine a select one of said watcher groups to receive said real time service information;
    maintaining watcher presence information and watcher preference information for each of said watchers, said watcher preference information specifying that no media types or only certain media types are available on any terminal of the watcher or particular terminals of the watcher when the watcher presence information indicates a busy status; and
    providing said real-time service information as said updated presence information to available terminals of said watchers within said select watcher group.

15. The method of claim 14, wherein said subscribing further includes:
    forwarding a user subscription request from a select one of said users to said information provider;
    receiving notification of acceptance of said user subscription request from said information provider; and
    adding said select user to a list of watchers of said information provider.

16. The method of claim 14, wherein said subscribing further includes:
    forwarding an information provider subscription request from said information provider to a select one of said users;
    receiving notification of acceptance of said information provider subscription request from said select user; and
    adding said select user to a list of watchers of said information provider.

17. The method of claim 14, wherein said real-time service information includes custom information for said select watcher group.

18. The method of claim 17, wherein said select watcher group subscribes to said custom information.

19. The method of claim 14, wherein said providing further includes:
    determining a presence status of a select one of said users, said presence status indicating the availability of said select user;
    queuing said updated presence information until said presence status indicates said select user is available; and
    upon determining said presence status indicates said select user is available, identifying a terminal associated with said select user to which said updated presence information is routed.

20. The method of claim 14, wherein said real-time service information includes one or more of lottery information, stock quote information, entertainment information, travel information and delivery information.

* * * * *